United States Patent
Stagon et al.

(10) Patent No.: US 10,828,816 B1
(45) Date of Patent: Nov. 10, 2020

(54) 3D PRINTED INJECTION MOLD COATING TO EXTEND LIFETIME AND PERFORMANCE

(71) Applicants: Stephen P. Stagon, Jacksonville, FL (US); Peter Cerreta, Jacksonville, FL (US); Ryan Scherzer, Jacksonville, FL (US)

(72) Inventors: Stephen P. Stagon, Jacksonville, FL (US); Peter Cerreta, Jacksonville, FL (US); Ryan Scherzer, Jacksonville, FL (US)

(73) Assignees: University of North Florida Board of Trustees, Jacksonville, FL (US); The Document Experts Inc., Jacksonville, FL (US)

( * ) Notice: Subject to any disclaimer, the term of this patent is extended or adjusted under 35 U.S.C. 154(b) by 393 days.

(21) Appl. No.: 15/896,795

(22) Filed: Feb. 14, 2018

Related U.S. Application Data (60) Provisional application No. 62/458,872, filed on Feb. 14, 2017.

(51) Int. Cl.
  *B29C 45/30* (2006.01)
  *B29C 45/37* (2006.01)
  (Continued)

(52) U.S. Cl.
  CPC .......... *B29C 45/37* (2013.01); *B29C 33/3842* (2013.01); *B29C 33/60* (2013.01);
  (Continued)

(58) Field of Classification Search
  CPC ..... B29C 45/37; B29C 45/73; B29C 33/3842; B29C 33/60; B29C 2045/7368; B29C 2045/2683; B29K 2995/0015
  See application file for complete search history.

(56) References Cited

U.S. PATENT DOCUMENTS

2005/0249602 A1\* 11/2005 Freling ............... B22C 7/02
  416/241 B
2013/0220572 A1\* 8/2013 Rocco ............... B22C 13/085
  164/520
(Continued)

FOREIGN PATENT DOCUMENTS

| JP | H10231704 A | 9/1998 |
| JP | 2005350341 A | 12/2005 |
| JP | 2010065634 A | 3/2010 |

OTHER PUBLICATIONS

Translation of JP2005350341A with a publication date of Dec. 22, 2005; Original Assignee: United Technol Corp.
(Continued)

*Primary Examiner* — Joseph S Del Sole
*Assistant Examiner* — Jamel M Nelson
(74) *Attorney, Agent, or Firm* — Smith & Hopen, P.A.; Paul Murty (57) ABSTRACT

A problem exists of prohibitively high costs associated with molds for small run, legacy, or prototype injection molded parts. Further, the lead time on molds is currently on the order of about two weeks. A mold is provided that is formed from three-dimensional printing. The mold includes a series of air and/or water cooling channels to limit thermal stresses to the mold. Additionally, a series of coatings is added to the surface of a 3D printed mold to extend the lifetime of the mold and increase the performance of the mold. The coatings perform a function other than to define a shape of an injection cavity, such as improving thermal conductivity, providing a thermal barrier between the injection material and the mold body, or improving the detachment of the final mold product from the mold body.

19 Claims, 6 Drawing Sheets

(51) Int. Cl.
  *B29C 45/73* (2006.01)
  *B29C 33/60* (2006.01)
  *B29C 33/38* (2006.01)
  *B33Y 80/00* (2015.01)
  *B29C 45/26* (2006.01)

(52) U.S. Cl.
  CPC ...... *B29C 45/73* (2013.01); *B29C 2045/2683* (2013.01); *B29C 2045/7368* (2013.01); *B29K 2909/02* (2013.01); *B29K 2995/0015* (2013.01); *B33Y 80/00* (2014.12)

(56) References Cited

U.S. PATENT DOCUMENTS

2013/0221575 A1* 8/2013 Altonen .................. B29C 33/38
  264/328.14
2015/0321403 A1* 11/2015 Kameyama ............ B29C 45/26
  264/41
2016/0158970 A1* 6/2016 Xie ........................ B29C 35/02
  249/78

OTHER PUBLICATIONS

Translation of JP2010065634A with a publication date of Mar. 25, 2010; Original Assignee: Hitachi Ltd.
Translation of JPH10231704A with a publication date of Sep. 2, 1998; Original Assignee: Ishikawajima Harima Heavy Ind Co Ltd.

* cited by examiner

3D PRINTED INJECTION MOLD COATING TO EXTEND LIFETIME AND PERFORMANCE

CROSS-REFERENCE TO RELATED APPLICATIONS

This nonprovisional application claims priority to provisional application No. 62/458,872, having the same title as this application, filed on Feb. 14, 2017, by the same inventors.

FIELD OF THE INVENTION

This invention relates, generally, to tooling equipment. More specifically, it relates to injection molds and molds formed from three-dimensional printing that exhibit extended lifetimes and enhanced performance, due to the coatings and/or the housings used in combination with the molds.

BACKGROUND OF THE INVENTION

Almost all consumer products made from plastic are formed through injection molding. Typically, mold tools are made from steel or aluminum through subtractive manufacturing techniques. These mold tools last for 100,000+ parts, but often require 15+ days for even the most rapid design and are prohibitively expensive for small batch manufacturing or prototyping.

Injection molding is commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The molten resin is injected into a mold cavity having a particular cavity shape. The resin is injected via hydraulic injection or motor-driven injection into a mold. The injection requires very high pressures, which require high clamping forces to hold the mold closed during filling, and sturdy molds to withstand the pressures, typically made from hardened tool steels. The clamping forces and mold structure result in very expensive molding equipment. The high pressures also require very high strength injection molds.

The mold itself may have a single cavity or multiple cavities. Each cavity may be connected to a flow channel by a gate, which directs the flow of the molten resin into the cavity. It is common for large parts to have two, three, or more gates to reduce the flow distance the polymer must travel to fill the molded part. The injected plastic is held under pressure in the mold cavity, and the plastic begins to solidify starting at the interface between the plastic and mold surface. Once cooled, the plastic part is removed as a solidified part having a shape that is complementary to the cavity shape of the mold.

Several companies offer 3d printed polymeric molds for much lower prices and 1 day turnaround times, but these molds only last for a maximum of 100 parts. If the life of these molds can be extended to ~1000 parts, these molds will become viable as a gap-stop for rapid need production, small batch high profit parts, and rapid prototyping runs.

Existing three-dimensional printed molds fail because of the high temperatures and pressures that the molds are exposed to during injection. The failure of the mold is typically through softening, thermal warpage, or hot tearing of the mold material. Although there is often conformal water cooling in large channels in the interior of these molds, the thermal conductivity of the polymer is prohibitively low and the front of the mold cannot sufficiently exhaust heat.

Accordingly, what is needed is a modified mold having an improved life cycle. In particular, what is needed is a modified mold including one or more coatings within the mold, and one or more fluidic channels from the mold to the exterior environment, thereby insulating the mold from extreme temperatures. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for an inexpensive injection mold having an increased lifespan is now met by a new, useful, and nonobvious invention.

The novel structure includes a mold body having an exterior wall and an interior wall, with the interior wall defining a cavity. An injection channel is in communication with the cavity and the exterior wall of the mold body. The injection channel is adapted to create a pathway for a molding material to be injected into the cavity. A cooling channel is disposed between the exterior and interior walls of the mold bold. The cooling channel is in fluidic communication with the cavity and an environment exterior to the exterior wall. The cooling channel is thereby configured to improve the thermal conductivity of the mold body by transferring heat energy from the mold body to the environment exterior to the exterior wall. The interior wall of the mold body includes at least one coating disposed thereon, with the at least one coating being configured to improve the thermal conductivity of the mold body.

In an embodiment, the mold body includes a first portion and a second portion, with each portion including an exterior wall and an interior wall, with the interior walls of the portions being adapted to rest against each other.

In an embodiment, the mold body is encased within a housing, with the injection channel being disposed within the housing and in communication with the cavity defined by the mold body. The cooling channel is disposed within the housing, and is in fluidic communication with the mold body.

An object of the invention is to provide a cooling channel and a coating that improve the thermal conductivity of the mold body, thereby increasing the lifespan of the mold body, allowing more injection molds to be created through the mold body in an efficient way.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

Figure 1:
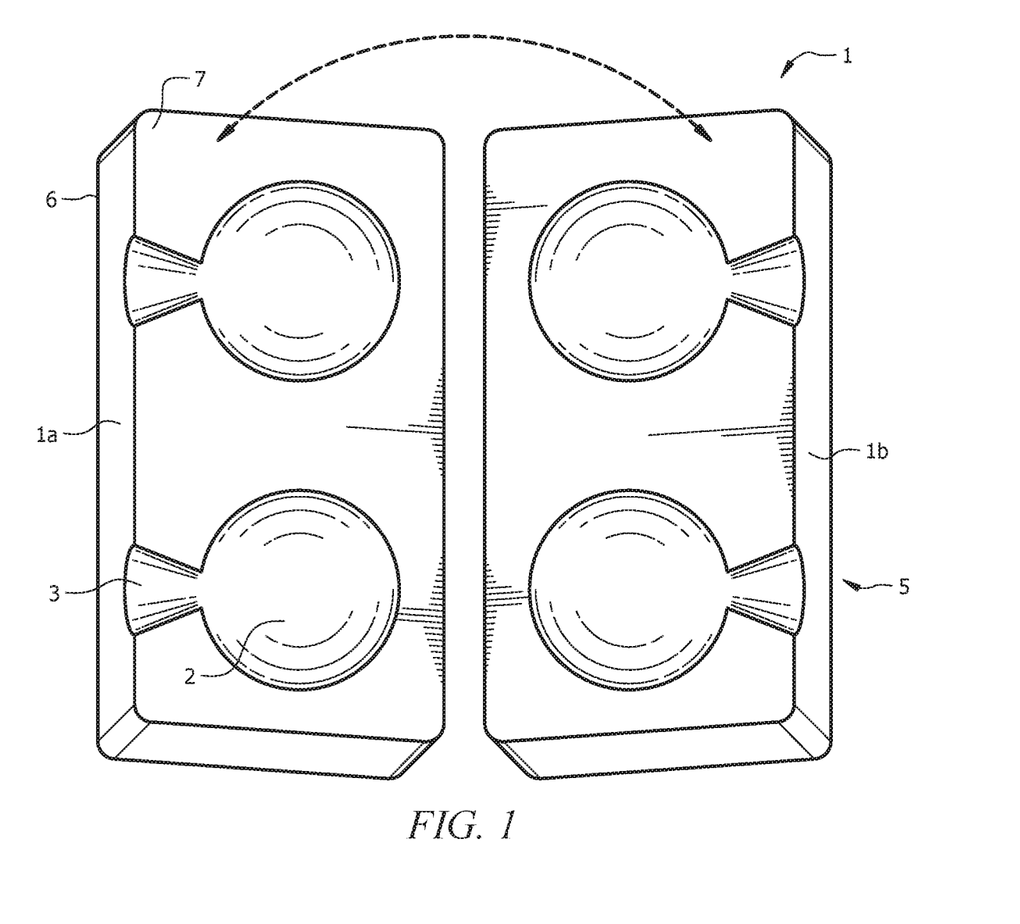
FIG. 1 is perspective view of a mold.

As shown in FIG. 1, mold 1 is formed of mold subparts 1a and 1b. Mold 1 includes injection cavity 2 and injection channel 3. While the drawings depict a single injection channel, it is known in the art that multiple injection channels can be used to facilitate more rapid material injection into mold 1, as discussed above. Mold 1 includes mold body 5, which includes exterior wall 6 and interior wall 7. Interior wall 7 defines injection cavity 2, as seen in FIG. 1. For one or more of mold subparts 1a, 1b, injection channel 3 is in communication with injection cavity 2 and exterior wall 6. Accordingly, injection channel 3 is adapted to create a pathway for a molding material to be injected into cavity 2. When the molding material is injected into cavity 2, mold body 5 can form an injection mold of a particular set of dimensions.

Mold body 5 is formed of a three-dimensional-compatible material. Non-limiting examples include thermoplastic polyurethane, polyethylene terephthalate, polyamide-imide, nylon, polyvinyl chloride, polycarbonate, polyphthalamide, polysulfone, maleimide/bismaleimide, polyetheretherketone, polyetherimide, polyimide, polyester, acrylonitrile butadiene styrene, carbon reinforced-polyimide, carbon reinforced-polyethylene terephthalate, carbon reinforced-polyamide-imide, carbon reinforced-nylon, carbon reinforced-polyvinyl chloride, carbon reinforced-polycarbonate, carbon reinforced-polyphthalamide, carbon reinforced-polysulfone, carbon reinforced-maleimide/bismaleimide, carbon reinforced-polyetheretherketone, carbon reinforced-polyetherimide, carbon reinforced-polyimide, carbon reinforced-polyester, carbon reinforced-acrylonitrile butadiene styrene, glass reinforced-polyimide, glass reinforced-polyethylene terephthalate, glass reinforced-polyamide-imide, glass reinforced-nylon, glass reinforced-polyvinyl chloride, glass reinforced-polycarbonate, glass reinforced-polyphthalamide, glass reinforced-polysulfone, glass reinforced-maleimide/bismaleimide, glass reinforced-polyetheretherketone, glass reinforced-polyetherimide, glass reinforced-polyimide, glass reinforced-polyester, glass reinforced-acrylonitrile butadiene styrene, and PLU for fuse deposition modeling. In addition to the above, polyamide-aluminum composite, polyamide-carbon reinforced composite, polyamide, polyamide-glass composite, thermoplastic polyurethane, nylon-glass composite, nylon Ex, nylon HST, nylon-carbon fiber composite, polystyrene, steel, titanium, aluminum, metal alloys, green sand, glass, and ceramic can be used for laser sintering 3-dimensional printing, such as SLS printing. Styrene plastics, vinyl ether plastics, N-vinyl carbazoles, lactones, lactams, cyclic ethers, cyclic acetals, cyclic siloxanes, epoxy and other epoxide compounds, urethanes, polyethers, polyesters and other photopolymers, epoxy and other stereolithography polymers may be used for stereolithography printing or jet printing, including multijet or polyjet printing. Sandstone and compositions thereof are useful in binderjet printing.

Figure 2:
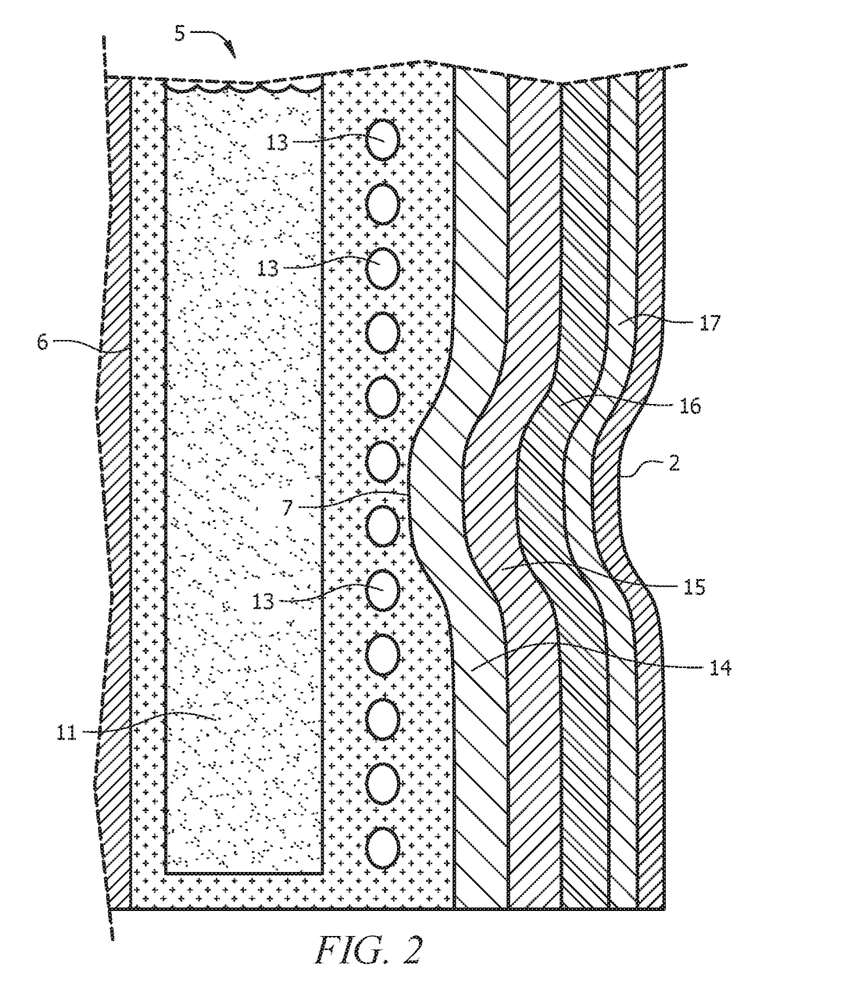
FIG. 2 is a cross-sectional view of a mold including coatings and cooling channels.
Figure 3:
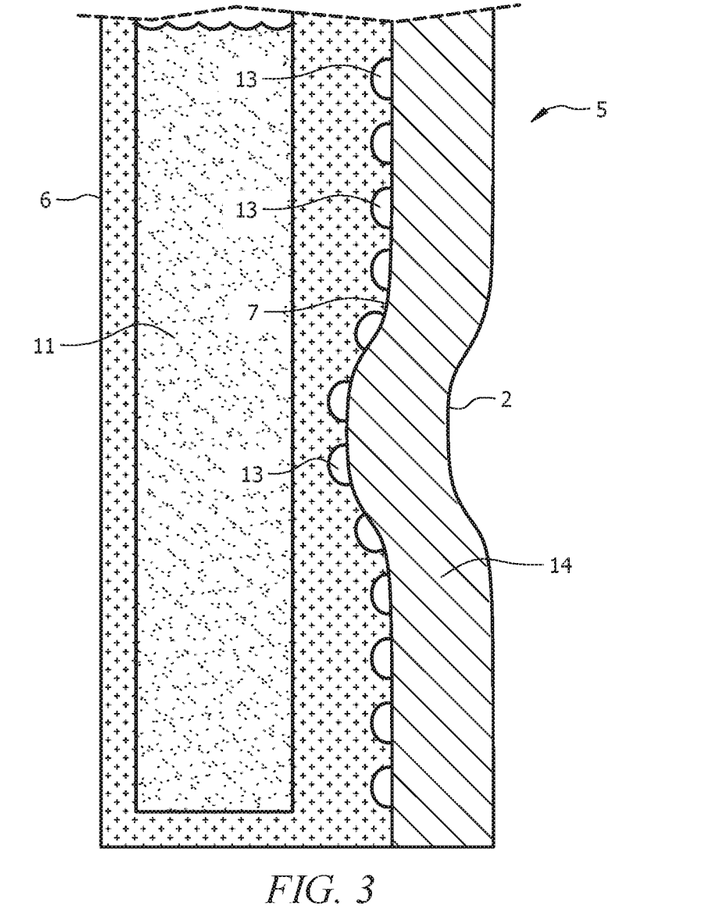
FIG. 3 is a cross-sectional view of a mold including a coating and cooling channels.
Figure 4:
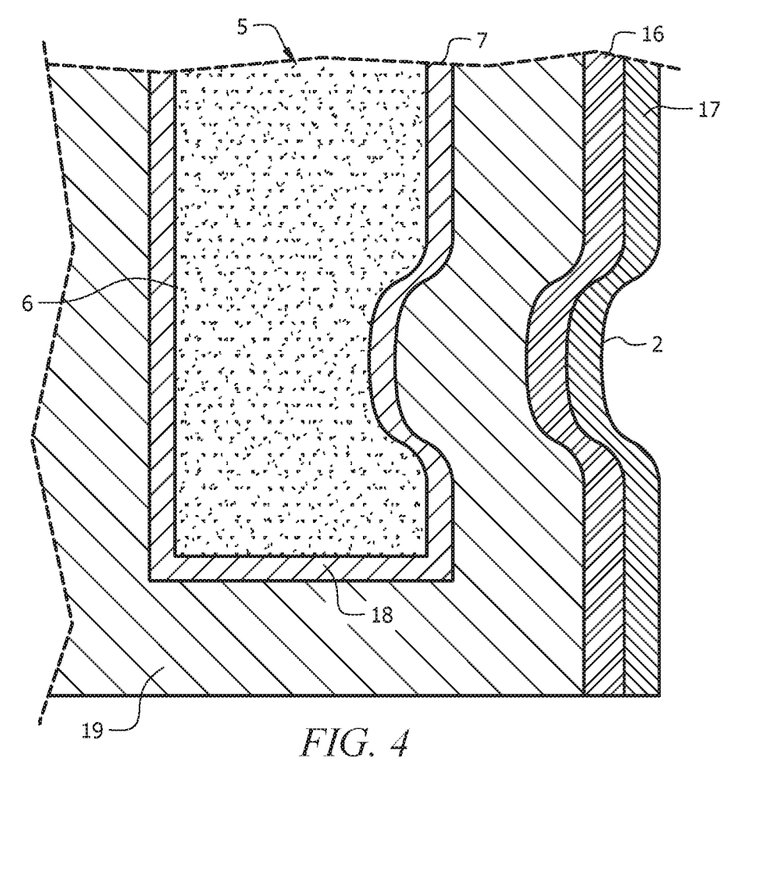
FIG. 4 is a cross-sectional view of a mold including a mold body surrounding by coatings.

Referring now to FIGS. 2-4, mold body 5 is not a solid structure. For example, conformal water channel 11 is disposed adjacent to exterior wall 6, with conformal water channel 11 being disposed between exterior wall 6 and interior wall 7. Conformal water channel 11 provides a fluidic channel formed within mold body 5, with conformal water channel 11 adapted to house water. As such, conformal water channel 11 helps improve the thermal conductivity of mold body 5 by absorbing heat from mold body 5 generated during the injection mold process.

Similarly, conformal air micro channels 13 are formed within mold body 5 during three-dimensional printing of mold body 5. Conformal air micro channels 13 are in communication with the environment exterior to exterior wall 6. Similar to conformal water channel 11, conformal air micro channels 13 are adapted to transfer heat energy from mold body 5 to the environment exterior to exterior wall 6. Accordingly, both conformal water channel 11 and conformal air micro channels 13 may be referred to as cooling channels, with water and air being referred to as cooling fluids. Conformal air micro channels 13 are similar to those in jet turbine engines, placed near the surface of the mold. Examples of microflow channels are noted in JP-A-10-231704, JP-A-2010-65634, and JP-A-2005-350341. In engine turbine microflow channels, the small channel or pores from a porous material are used to direct fluid flow through a material and thereby reduce temperatures in the material. Advantageously, three-dimensional printing permits manufacture of complex shapes, including cavities, that are limited by the resolution of the printer and mold material. Because the pressures inside these microfluid channels are kept high, the mechanical integrity of the area is maintained during injection molding. The high-pressure flow also locally cools close to the surface.

Still referring to FIGS. 2-4, mold body 5 includes a plurality of coatings designed for a variety of purposes, such as allowing a printed mold to be easily removed from mold body 5, or transferring heat energy from mold body 5 to the exterior environment. Specifically, the plurality of coatings are disposed on interior wall 7, such that injection cavity 2 becomes coated with the plurality of coatings. One example of a coating is binding layer 14. Binding layer 14 is disposed on interior wall 7, and may be a material such as tantalum, titanium, chromium, or other refractory metal. In some variations, binding layer 14 is PVD coated. Binding layer 14 has a high melting point, allowing binding layer 14 to withstand high temperatures during the injection mold process. Binding layer 14 is adapted to adhere mold body 5 to other coatings disposed adjacent to binding layer 14. Another example of a coating is strain tolerant layer 15, which is a layer of soft, ductile metal. Strain tolerant layer 15 accommodates for thermal strain mismatch and thermal expansion. Examples of materials of strain tolerant layer 15 are copper, silver, indium, tin, or a similar alloy. Similar to binding layer 14, strain tolerant layer 15 is thermally conductive. Each of binding layer 14 and strain tolerant layer 15 are adapted to remove heat from interior wall 7 of mold body 5, and transfer heat energy to conformal air micro channels 13 and conformal water channel 11. Binding layer 14 and strain tolerant layer 15 may be referred to as thermally conductive layers, which absorb heat energy during the injection mold formation process, thereby largely insulating mold body 5 from being subjected to the heat energy.

A rapid vapor deposition coating is optionally added, to act as a thermal barrier coating to the surface. For example, e-beam or sputtering can be used to deposit a simple thick layer of low cost oxide material, aluminum oxide or silicon dioxide, that provides a very high thermal resistance. This layer can be deposited at an oblique angle to make it somewhat porous, to trap air gaps and increase thermal resistance. To get this layer to stick, surface treatment of the polymer part is undertaken, such as plasma etching immediately before deposition. Some surface roughness can be added by a rapid pumice scrub or through minor bead blasting.

Another coating is porous ceramic thermal resistance layer 16, which may be disposed on strain tolerant layer 15. Porous ceramic thermal resistance layer 16 is optionally alumina or YZr. Both thermal resistance layer 16, as well as the optional rapid vapor deposition coating, have low thermal conductivity. As such, these layers are adapted to prevent heat energy from entering mold body 5 through interior wall 7. Invariably, during the injection mold process, some heat will enter mold body 5, despite the low thermal conductivity of thermal resistance layer 16. The other thermally conductive coatings disposed on mold body 5 are adapted to transfer the heat that enters mold body 5 to conformal air micro channels 13 and conformal water channel 11, as discussed above.

Mold body 5 includes mold release layer 17, which forms an outermost layer disposed on mold body 5. Mold release layer 17 is formed of a hard material to prevent deformation of mold body 5. Mold release layer 17 has high lubricity to allow a mold formed via injection molding to be easily removed from mold body 5. Nonlimiting examples of the material of mold release layer 17 are nickel, chromium, nickel boride, nickel Teflon, or titanium nitride. An injection mold material is injected into mold release layer 17, filling injection cavity 2, thereby allowing the injection mold material to be formed on mold release layer 17. This allows a finished mold to be easily removed from injection cavity 2 after being formed and cooling. In some variations, bond coating 14, strain tolerant layer 15, porous ceramic thermal resistance layer 16, and mold release layer 17 are deposited on mold body 5 via PVD, electrodeposition, electroless deposition, plasma spray, reactive spray.

Referring particularly to FIG. 4, a cross-section of the coatings disposed on mold body 5 are shown in detail. In FIG. 4, mold body 5 is surrounded by a plurality of coatings. Mold release layer 17 forms an outermost coating disposed on mold body 5, such that mold release layer 17 is in communication with an injected material during the injection mold process. Mold release layer 17, as discussed above, helps to easily disconnect an injection mold from mold body 5 after the injection mold formation process is complete. The injection mold is formed within injection cavity 2, which is disposed such that the injection mold is formed against mold release layer 17. Thermal resistance layer 16 is disposed adjacent to mold release layer 17 and acts as a thermal barrier to prevent some heat energy from entering mold body 5. Heat energy that enters mold body 5 through thermal resistance layer 16 first encounters nickel/nickel phosphide layer 19. Nickel/nickel phosphide layer 19 adds strength to mold body 5, thereby preventing strain, warping, and other forms of degradation. Nickel/nickel phosphide layer 19 is coupled to mold body 5 via adhesion layer 18, which helps keep nickel/nickel phosphide layer 19 attached to mold body 5. Both nickel/nickel phosphide layer 19 and adhesion layer 18 help absorb the heat energy that passes through thermal resistance layer 16. Since nickel/nickel phosphide layer 19 and adhesion layer 18 are both thermally conductive, the layers transfer the absorbed heat energy to cooling channels 11 or 13 (not shown in FIG. 5), which can then remove the heat energy from mold body 5.

In the case of a very high-pressure injection, some of these metal layers can be added to high thicknesses, up to 100 microns or more, to increase the strength of the face of the mold. This acts as an exoskeleton for the mold face, which can then withstand very high pressures. Conformal cooling channels can be placed right at the surface of the mold in this case, and filled with dissolvable or meltable support. After the thick metal layer is added, these cooling channels can be emptied and there will be local cooling directly below the surface.

Figure 5:
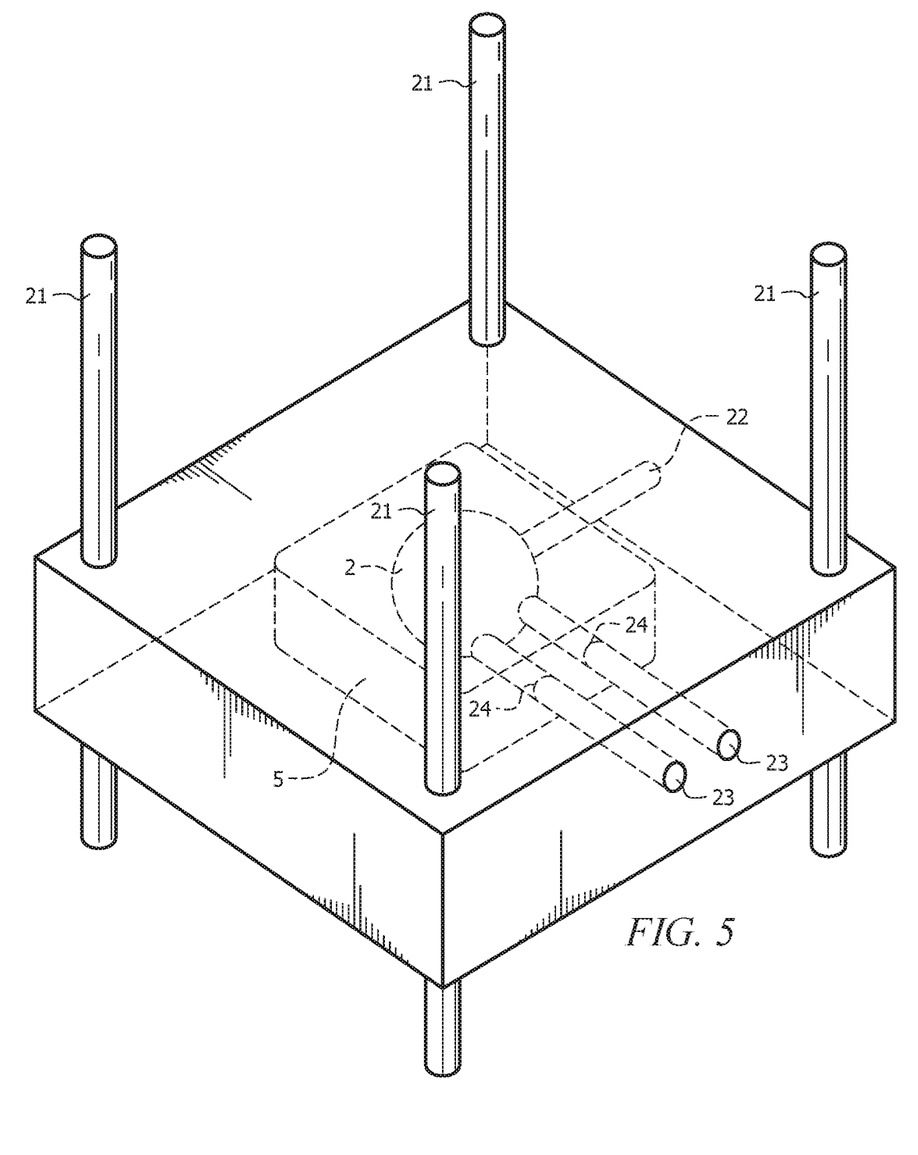
FIG. 5 is a perspective view of a mold encased within a housing.

Referring now to FIG. 5, mold body 5 may be formed within housing 20. Housing 20 is formed of a metal material to further increase the thermal conductivity of mold body 5. Housing 20 includes through-bores that allow housing 20 to be disposed on rails 21. Accordingly, multiple housings can be disposed on a set of rails, with the housings being spaced apart, allowing multiple molds to be formed on the set of rails.

Housing 20 includes injection channel 22 that is in communication with mold body 5, allowing injection mold material to be transferred into mold body 5. Housing 20 also includes cooling channel 23 disposed therein, with cooling channel 23 being in communication with mold body 5. As such, cooling channel 23 provides a fluidic channel wherein heat energy can be removed from mold body 5 and exhausted into the environment exterior to housing 20. The connection between cooling channel 23 and mold body 5 includes flow gate 24, which is adapted to control the flow of cooling fluid between mold body 5 and the environment exterior to housing 20. For example, if the temperature of mold body 5 becomes too hot, flow gate 24 may be opened to allow more fluid to interact with mold body 5. If the temperature of mold body 5 is below a threshold temperature, flow gate 24 may be closed.

Figure 6:
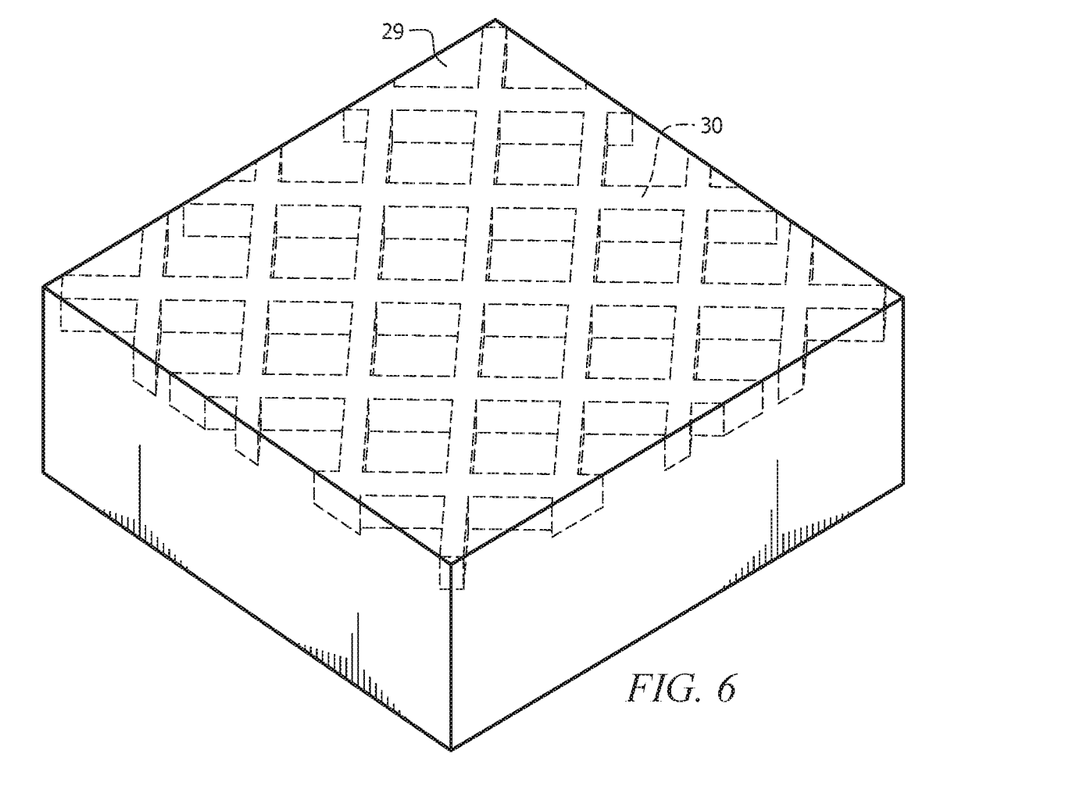
FIG. 6 is perspective view of a housing that encases a mold.
Figure 7:
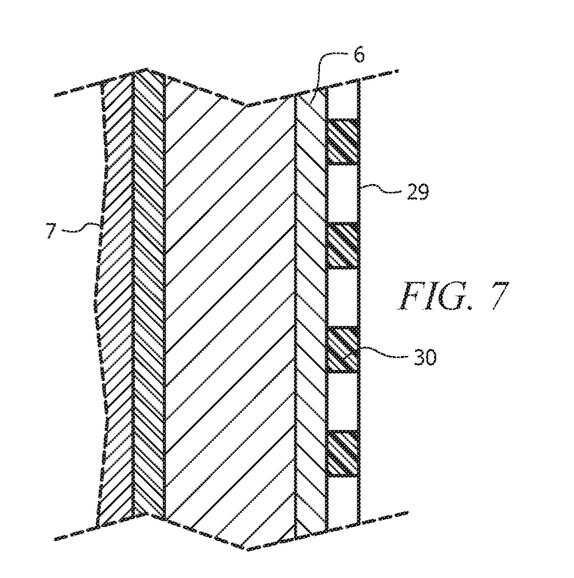
FIG. 7 is a cross-sectional view of a housing that encases a mold.

FIGS. 6-7 show an embodiment of housing 20 including ribs 30. Ribs 30 are disposed within housing 20 and spaced apart from mold body 5, which is not shown in FIGS. 6-7. Ribs 30 further increase the strength of housing 20, and further increase thermal conductivity by absorbing heat energy generated within mold body 5 during the injection mold process. Ribs 30 also increase the stiffness of housing 20, thereby prevent warping. As shown in FIG. 7, ribs 30 extend in a direction away from an exterior surface of housing 20 and toward mold body 5. For example, each rib 30 may be about 100 microns deep and about 1 mm wide, but can be as small as about 100 microns wide.

Glossary of Terms

About: as used herein, means approximately or nearly and in the context of a numerical value or range set forth means about 15 percent of the numerical.

Coating: is a layer of material less than 0.13 mm (0.005 in) in thickness, that is disposed on a surface of a mold body, that has a primary function other than defining a shape of a mold cavity (e.g., a function of protecting the material defining the mold cavity, a function of reducing friction between a molded part and a mold cavity wall to enhance removal of the molded part from the mold cavity, a function of absorbing heat energy).

Cooling channel: is a pathway through which heat can be removed from a mold body, such as by being exhausted into an exterior environment outside of the mold body.

High pressure: as used herein, means pressures at or above 100 PSI.

Injection channel: is a pathway through which materials can be injected.

Low pressure: as used herein, means pressures below 100 PSI.

Rib: is a layer of material coupled to or formed on a structure that increases the stiffness and thermal conductivity of the structure.

Thermal conductivity: as used herein, means a capability to transfer heat.

Useful life: is the expected life of a mold before failure or scheduled replacement. When used in conjunction with a mold (or any part of the mold that defines the mold cavity), the term "useful life" means the time a mold is expected to be in service before quality problems develop in the mold, or before mechanical failure (e.g., fatigue failure or fatigue cracks) occurs in the mold.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

What is claimed is:

1. An injection mold comprising:
   a mold body including an exterior wall and an interior wall having an outward-facing surface, the interior wall defining an injection cavity, the interior wall having an inward-facing surface opposite the outward-facing surface;
   an injection channel in fluidic communication with the injection cavity and the exterior wall, the injection channel creating a pathway for a molding material to be injected into the injection cavity;
   a thermally conductive cooling channel disposed within the mold body between the exterior wall and the inward-facing surface of the interior wall, the thermally conductive cooling channel in fluidic communication with the injection cavity and the exterior wall, the thermally conductive cooling channel adapted to remove heat energy from the mold body;
   a thermally conductive layer disposed on the outward-facing surface of the interior wall; and
   a mold release layer disposed on the thermally conductive layer, such that the thermally conductive layer is disposed between the mold release layer and the outward-facing surface of the interior wall.

2. The injection mold of claim 1, wherein the cooling channel is one of a plurality of conformal air micro channels, the plurality of conformal air micro channels configured to interact with the mold body to improve thermal conductivity of the mold body by removing heat energy from the mold body.

3. The injection mold of claim 1, further comprising:
   a conformal water channel disposed adjacent to the exterior wall of the mold body, the conformal water channel disposed to receive a fluid therein, the fluid configured to interact with the mold body to improve thermal conductivity of the mold body by removing heat energy from the mold body.

4. The injection mold of claim 1, further comprising a thermal resistance layer disposed between the thermally conductive layer and the mold release layer, the thermal resistance layer adapted to decrease an amount of heat energy entering the mold body.

5. The injection mold of claim 1, further comprising:
   a thermally conductive housing encasing the mold body, the housing adapted to remove heat energy from the mold body.

6. The injection mold of claim 1, further comprising:
   a first portion of the mold body and a second portion of the mold body, each of the first and second portion including an exterior wall and an interior wall, the interior walls of the first and second portions adapted to rest against each other.

7. An injection mold comprising:
   a mold body including an exterior wall and an interior wall having an outward-facing surface, the interior wall defining an injection cavity, the interior wall having an inward-facing surface opposite the outward-facing surface;
   an injection channel in fluidic communication with the injection cavity and the exterior wall, the injection channel creating a pathway for a molding material to be injected into the injection cavity;
   a plurality of conformal air micro channels disposed within the mold body between the exterior wall and the inward-facing surface of the interior wall, the plurality of conformal air micro channels in fluidic communication with the injection cavity and the exterior wall, the plurality of conformal air micro channels adapted to remove heat energy from the mold body;
   a thermally conductive layer disposed on the outward-facing surface of the interior wall; and
   a mold release layer disposed on the thermally conductive layer, such that the thermally conductive layer is disposed between the mold release layer and the outward-facing surface of the interior wall.

8. The injection mold of claim 7, further comprising a conformal water channel disposed adjacent to the exterior wall of the mold body, the conformal water channel disposed to receive a fluid therein, the fluid configured to interact with the mold body to improve thermal conductivity of the mold body by removing heat energy from the mold body.

9. The injection mold of claim 7, wherein the thermally conductive layer is adapted to transfer heat energy from the mold release layer to the plurality of conformal air micro channels.

10. The injection mold of claim 7, further comprising:
a thermal resistance layer disposed between the thermally conductive layer and the mold release layer, the thermal resistance layer adapted to decrease an amount of heat energy entering the mold body.

11. The injection mold of claim 7, further comprising:
a layer disposed between the outward-facing surface of the interior wall and the thermally conductive layer, the stiffness layer adapted to increase a stiffness value of the mold body and enhance thermal conductivity of the mold body.

12. The injection mold of claim 7, further comprising:
a thermally conductive housing encasing the mold body, the housing adapted to absorbing heat energy from the mold body.

13. The injection mold of claim 12, further comprising:
a plurality of ribs disposed on the housing, the plurality of ribs being adapted to increase a stiffness of the housing and enhance thermal conductivity of the mold body.

14. An injection mold comprising:
a thermally conductive housing encasing a mold body disposed therein, the mold body including an exterior wall and an interior wall having an outward-facing surface the interior wall defining an injection cavity, the interior wall having an inward-facing surface opposite the outward-facing surface;
an injection channel in fluidic communication with the injection cavity and the housing, the injection channel creating a pathway for a molding material to be injected into the injection cavity;
a plurality of conformal air micro channels disposed within the mold body between the exterior wall and the inward-facing surface of the interior wall, the plurality of conformal air micro channels in fluidic communication with the injection cavity and the housing, the plurality of conformal air micro channels adapted to remove heat energy from the mold body;
a conformal water channel disposed adjacent to the exterior wall of the moldy body, the conformal water channel disposed to receive a fluid therein, the fluid configured to interact with the mold body to improve thermal conductivity of the mold body by removing heat energy from the mold body;
a thermally conductive layer disposed on the outward-facing surface of the interior wall; and
a mold release layer disposed on the thermally conductive layer, such that the thermally conductive layer is disposed between the mold release layer and the outward-facing surface of the interior wall.

15. The injection mold of claim 14, further comprising a cooling channel disposed within the housing and in communication with the mold body and an environment exterior to the housing, the cooling channel disposed to receive a cooling fluid, the cooling fluid configured to interact with the mold body to improve thermal conductivity of the mold body by removing heat energy from the mold body and the housing.

16. The injection mold of claim 15, further comprising:
a flow gate disposed within the cooling channel, the flow gate configured to selectively allow the cooling fluid to interact with the mold body depending on a temperature of the mold body.

17. The injection mold of claim 14, wherein the thermally conductive layer is adapted to transfer heat energy from the mold release layer to the housing via the plurality of conformal air micro channels.

18. The injection mold of claim 14, further comprising:
a thermal resistance layer disposed between the thermally conductive layer and mold release layer, the thermal resistance layer adapted to decrease an amount of heat energy from entering the mold body.

19. The injection mold of claim 14, further comprising:
a plurality of ribs disposed on the housing, the plurality of ribs being adapted to increase a stiffness of the housing and enhance thermal conductivity of the mold body.

* * * * *

UNITED STATES PATENT AND TRADEMARK OFFICE
CERTIFICATE OF CORRECTION

PATENT NO. : 10,828,816 B1
APPLICATION NO. : 15/896795
DATED : November 10, 2020
INVENTOR(S) : Stephen P. Stagon, Peter Cerreta and Ryan Scherzer Page 1 of 1

It is certified that error appears in the above-identified patent and that said Letters Patent is hereby corrected as shown below:

Column 9, Claim 11, Line 19 should read:
A stiffness layer disposed between the outward-facing surface of Signed and Sealed this
Fifth Day of January, 2021

Andrei Iancu
*Director of the United States Patent and Trademark Office*